United States Patent Office 3,132,110
Patented May 5, 1964

3,132,110
COPRECIPITATED ALUMINA-ZIRCONIUM OXIDE SULFATE-CONTAINING CATALYST
Rowland C. Hansford, Fullerton, Calif., assignor to Union Oil Company of California, Los Angeles, Calif., a corporation of California
No Drawing. Filed Jan. 12, 1959, Ser. No. 786,046
1 Claim. (Cl. 252—440)

This invention relates to new acid catalysts of the adsorbent solid type, and to their use in acid-catalyzed hydrocarbon conversions such as polymerization, isomerization, alkylation, cracking and the like. More specifically, the new catalysts of this invention comprise as an essential active ingredient, a hydrous zirconium oxide containing a minor proportion of residual sulfate ion in an active, non-water-extractable form. According to another modification of the invention, the active composite of hydrous zirconium oxide and residual sulfate is supported on a carrier having an extended surface area, such as alumina, silica, activated carbon and the like.

It is well known that many hydrocarbon conversions such as polymerization, isomerization, alkylation, cracking, etc., are catalyzed by acidic materials. In some cases, such as the alkylation of isobutane with olefins, a liquid catalyst such as sulfuric or hydrofluoric acid is ordinarily used. In other cases, such as isomerization or cracking, an acidic solid catalyst having an extended surface area such as silica-alumina, alumina, or fluorided alumina is used.

Catalysts of the adsorbent solid variety are generally preferred for industrial applications, because they are easily handled and are usually readily regenerable by oxidation to burn off deactivating carbonaceous deposits. Furthermore, it is ordinarily much easier to separate the reaction products from solid catalysts than from liquid catalysts.

In addition to having a satisfactorily high activity, the principal requirements for solid catalysts are ease and cheapness of preparation, and stability at high temperatures. It is accordingly a principal objective of this invention to provide new acid catalysts of the solid type, which exhibit a high activity and are easily prepared from inexpensive raw materials. A further objective is to provide solid acid catalysts of suitable heat stability. Specific objectives include the provision of desirable acid catalysts for the isomerization of paraffins, olefins, naphthenes and/or alkyl aromatics; the cracking of hydrocarbons of all varieties, including specifically gas oils and lower paraffins; the polymerization of olefins and/or diolefins; and the alkylation of aromatics with olefins, or of isoparaffins with olefins. These and other objectives which will appear hereinafter are achieved in the use of the novel catalysts herein described.

The catalyst of this invention in its simplest form is readily prepared by adding a suitable base such as ammonia to an aqueous solution of zirconium sulfate, resulting in the precipitation of a hydrous zirconia gel containing combined, or chemisorbed, sulfate ions. The precipitate is removed by filtration, dried, and washed with water until the sulfate content (as $SO_4$) is reduced to between about 0.1 and 15% by weight. In place of ammonia other soluble alkalis such as sodium hydroxide, potassium hydroxide, ammonium carbonate, and the like may be employed. Generally the removal of soluble salts produced by the neutralization with ammonia or other alkali is sufficiently complete following a simple water washing of the wet precipitate. It is preferred, though not essential, to continue the washing operation until the wash water is substantially free of sulfate ion. It is hence apparent that the sulfate which remains affixed in the solid hydrogel is in a different form than existed in the original zirconium sulfate, since the latter is very soluble in water.

According to another method for producing an active catalyst of this invention, zirconium sulfate is simply calcined at e.g., 1200°–1500° F. until the greater part of the salt is decomposed to zirconium oxide and oxides of sulfur. It will be noted that this procedure is advantageous in that a final calcined catalyst is obtained by a single step. This is important in that a major cost in catalyst manufacture resides in the time, labor, and facilities required for carrying out multi-step manufacturing processes.

The sulfated zirconium catalyst prepared as above described may be used as such, or it may be supported on a carrier having a relatively high surface area. The sulfated zirconia gel itself has a relatively low surface area after calcining, and its activity per unit weight is materially increased by distending it over a porous inert carrier having a high surface area. This may be accomplished by first impregnating the carrier in the form of a powder or granules with the aqueous zirconium sulfate solution. The impregnated carrier is then contacted with the aqueous alkali such as ammonia, thereby effecting the desired precipitation of sulfated zirconia within the pores of the carrier. The alkali-treated carrier is then dried and washed to remove extraneous salts and excess sulfate ion. Alternatively, a supported catalyst may be more simply prepared by simply impregnating the carrier with aqueous zirconium sulfate, draining and drying the impregnated carrier and then calcining at e.g., 1200°–1500° F. until most of the sulfate is decomposed. In some cases it may be advantageous to coprecipitate the hydrous zirconia along with another hydrous oxide, such as alumina, and to leave a certain amount of residual sulfate in the composite. This may be accomplished for example by adding a suitable base, e.g., ammonia, to an aqueous solution of zirconium sulfate and aluminum sulfate.

Suitable carriers for use herein include substantially any inert, porous, solid material of suitable heat stability and surface area. Examples include activated alumina, silica-gel, activated charcoal, acid activated clays such as bauxite or bentonite, and the like. It is preferred in all of these cases that the finished catalyst should contain between about 0.1 and 25% by weight of $SO_4$, and preferably between about 2 and 10%, based on the zirconia content of the catalyst.

Examples of the utility of these catalysts are many and varied. They may be employed to isomerize paraffinic and/or naphthenic hydrocarbons, and convert one isomer to another. For example, n-heptane and n-octane are poor fuels for internal combustion engines, whereas the iso-heptanes and iso-octanes are excellent motor fuels. Accordingly, the catalysts of this invention may be used to convert n-paraffins to iso-paraffins. They may also be used to convert butane to isobutane, and also to effect the alkylation of isobutane with olefins, thereby forming alkylate motor fuel.

The catalyst of this invention may also be employed to isomerize methylcyclopentane to cyclohexane, or dimethylcyclopentane to methylcyclohexane. The distribution of isomeric products may be controlled by varying the time and/or severity of reaction. In general, the less highly branched isomers are formed first and these are then converted to the more highly branched isomers. The products of isomerization may hence be predominantly one particular isomer, or a more complex mixture may be obtained depending upon the completeness of conversion. In addition to using pure hydrocarbons as feed, various mixtures may be employed, such as light paraffinic gasoline fractions.

Alkyl aromatic hydrocarbons may also be isomerized. For example, meta-xylene and/or ortho-xylene may be converted to an equilibrium mixture containing about 20% of para-xylene. Similarly, ortho- and/or meta-cymene may be isomerized to form equilibrium proportions of para-cymene.

Olefins may also be isomerized, either to effect a simple shift in the double bond or to rearrange the carbon skeleton. Generally, more severe conditions of isomerization are required to convert n-olefins to iso-olefins than are required to bring about a shift in the position of the double bond. Thus, 1-butene may be converted to 2-butene, and under more severe conditions to isobutene. n-Hexene may be converted to iso-hexenes. Cyclohexene may be converted to methylcyclopentene. Generally, when olefins are being isomerized, polymerization will also take place to a greater or lesser extent, depending upon the conditions employed and the particular olefin used. In general, the higher olefins polymerize more readily than the lower olefins, and iso-olefins more readily than n-olefins. Isomerization conditions in the upper temperature range tend to decrease the relative rate of polymerization as compared to isomerization.

In polymerization reactions, olefins such as propylene, butene, isobutene, 1-pentene, iso-pentene, hexenes, octenes, and dodecenes, or mixtures thereof, may be subjected to polymerization to obtain mainly dimers and trimers. High molecular weight polymers in the highly viscous and solid range are generally not obtained with the present catalysts.

In typical alkylation reactions, aromatic hydrocarbons such as benzene, toluene, xylenes, pseudocumene, naphthalene and the like may be subjected to alkylation with olefins such as ethylene, propylene, butene, hexene, and the like, to obtain products alkylated in varying degrees depending upon the ratio of alkylating agent and the conditions of alkylation. Iso-paraffins, such as isobutane, isopentane and the like may be subjected to alkylation with olefins, such as propylene, butene, and the like to form alkylate gasoline fractions containing highly branched paraffins, and constituting valuable high octane gasoline blending stocks.

All of the foregoing reactions are preferably carried out in the vapor phase by simply contacting the feed with the granular catalyst under suitable conditions of temperature and pressure. Generally the feed rates may vary between about 0.2 and 10 volumes per volume of catalyst per hour. Suitable conditions of temperature and pressure for the principal reactions described above are as follows:

| Process | Temperature, °F. | |
| --- | --- | --- |
| | Operative | Preferred |
| Cracking: | | |
| Gas oil feeds | 700–1,000 | 800–950 |
| Lower paraffins | 900–1,400 | 1,000–1,350 |
| Isomerization: | | |
| Olefins | 500–900 | 600–750 |
| Paraffins and naphthenes | 700–1,000 | 800–950 |
| Alkyl-aromatics | 700–1,000 | 800–950 |
| Polymerization: | | |
| Lower olefins | 500–1,000 | 700–850 |
| Higher olefins | 500–900 | 700–850 |
| Diolefins | 300–900 | 500–800 |
| Alkylation: | | |
| Of aromatics | 300–800 | 500–750 |
| Of isoparaffins | 500–900 | 600–800 |

The following examples are cited to illustrate specific results obtainable herein, but are not intended to be limiting in scope.

*Example I*

A catalyst was prepared by adding an excess of ammonia to a solution of $Zr(SO_4)_2 \cdot 4H_2O$, filtering the resulting precipitate, drying at 100° C., and washing until the washings tested free of sulfate ion when barium chloride was added. The washed product was again dried, pelleted, and calcined at 600° C. The surface area of the calcined product was 35 square meters per gram. It contained 8.2% sulfate which was not removed even after exhaustive water washing.

This catalyst was tested for the isomerization of cyclohexene to methylcyclopentene under the following conditions:

Atmospheric pressure
375° C.
2 LHSV

The total conversion of cyclohexene was 82.1%. The products were 1.7% light hydrocarbons, 7.9% methylcyclopentane, 51.5% methylcyclopentene, and 21.0% polymer.

*Example II*

Another catalyst was prepared in a manner similar to that described in Example I, except that the product was washed exhaustively with dilute ammonia until the washings tested free of sulfate. The calcined catalyst contained 0.12% residual sulfate.

When tested as described above for the isomerization of cyclohexene, it showed a conversion of 3.1% to the following products: light ends—0.2%, methylcyclopentene—2.9%, polymer—0.0%.

*Example III*

A pure alumina catalyst was prepared by hydrolyzing distilled aluminum isopropoxide with water. The product after calcining at 600° C. had a surface area of 171 square meters per gram. When tested for the isomerization of cyclohexene at 375° C., it showed a conversion of 54.8%. No polymer was formed, and 1.5% of light hydrocarbons was the only other product besides methylcyclopentene.

*Example IV*

A commercial silica-alumina cracking catalyst (88% $SiO_2$–12% $Al_2O_3$) was tested for the isomerization of cyclohexene at 350° C. The conversion to light hydrocarbons was 2.6%, methylcyclopentane 2.2%, methylcyclopentene 52.7%, and polymer 39%. The surface area of this catalyst was 316 square meters per gram.

Since both the alumina and the silica-alumina compositions described in Examples III and IV are useful catalysts or catalyst components for various types of hydrocarbon reactions, including isomerization and reforming, it is clear that the catalyst of this invention is also useful for such reactions.

It should be noted that the catalyst of the present invention (Example I) has a much lower surface area than that of the catalysts described in Examples III and IV. Its specific activity (activity per unit weight) is therefore very high. By distending the sulfated zirconium oxide on a high-area support such as charcoal, alumina, silica, and the like, higher activities can be realized.

For example, when the activated alumina catalyst of Example III is impregnated with aqueous zirconium sulfate, and the product is dried and calcined to give a final composition containing about 15% by weight of $ZrO_2$ and 2% by weight of $SO_4$, the resulting catalyst, when tested for the isomerization of cyclohexene at 350° C., is found to give higher conversions to the desired products (methylcyclopentene and polymer) than were obtained in either Example I or Example IV.

*Example V*

A catalyst comprising 39.5% $Al_2O_3$, 48.3% $ZrO_2$, and 12.2% $SO_4^=$ was prepared by coprecipitation from an aqueous solution of $Al_2(SO_4)_3$ and $Zr(SO_4)_2$ by addition of ammonia. The slurry was filtered, dried, and washed with distilled water until the washings tested free of sulfate. The product was dried, pelleted, and calcined at 600° C. The finished catalyst had a surface area of 66 square meters per gram. When tested as in Example I, it gave a total conversion of 86.2%, of which 1.6% was light hydrocarbons, 9.2% was methylcyclopentane, 55.4% was methylcyclopentene, and 20.0% was polymer.

By comparison with Example I it will be seen that by increasing the surface area of the catalyst from 35 to 66 square meters per gram, an appreciable increase in activity is obtained, notwithstanding the lower concentration of zirconia.

After extended use at high temperatures, the catalysts of this invention eventually become deactivated by the deposition of coke and other deposits. When this occurs, the catalyst can be regenerated in conventional manner by oxidizing with dilute oxygen-containing gases at e.g. 700°–1400° F. It is found that oxidation does not materially decompose the sulfate moiety at temperatures below about 1400° F.

The catalyst of this invention may be employed either in fixed bed operations as above illustrated, or the now-conventional moving bed, or fluidized bed, contacting processes may be employed.

The foregoing description is not intended to be limiting in scope except where indicated. Other variations will readily occur to those skilled in the art, and all such variations are intended to be included. The true scope of the invention is intended to be embraced by the following claim.

I claim:

An isomerization catalyst composition consisting essentially of coprecipitated alumina, a minor proportion of zirconium oxide and about 0.1% to 25% by weight of sulfate radicals based on the zirconium oxide content of the catalyst, said sulfate radicals being combined with said zirconium oxide in non-water-extractable form, said catalyst having been prepared by adding an excess of ammonia to an aqueous solution of zirconium sulfate and aluminum sulfate to effect coprecipitation of hydrous sulfated zirconia and hydrous alumina, followed by drying, washing to reduce the sulfate content of the coprecipitated gel to between about 0.1% and 15% by weight, and calcining.

References Cited in the file of this patent

UNITED STATES PATENTS

| | | |
|---|---|---|
| 2,396,758 | Stratford | Mar. 19, 1946 |
| 2,444,913 | Bond | July 13, 1948 |
| 2,472,832 | Hunter et al. | June 14, 1949 |
| 2,595,056 | Connolly | Apr. 29, 1952 |
| 2,867,578 | Hirshler | Jan. 6, 1959 |
| 2,894,898 | Oettinger et al. | July 14, 1959 |
| 3,032,599 | Holm et al. | May 1, 1962 |

FOREIGN PATENTS

| | | |
|---|---|---|
| 392,954 | Great Britain | May 22, 1933 |